United States Patent [19]

Lescovich

[11] Patent Number: 5,183,568

[45] Date of Patent: Feb. 2, 1993

[54] SELF-CLEANING STRAINER

[75] Inventor: Joseph E. Lescovich, Pittsburgh, Pa.

[73] Assignee: G A Industries, Inc., Mars, Pa.

[21] Appl. No.: 748,659

[22] Filed: Aug. 22, 1991

[51] Int. Cl.$^5$ ............... B01D 33/067; B01D 33/11
[52] U.S. Cl. .......................... 210/360.1; 210/373;
      210/374; 210/375; 210/392; 210/393; 210/396;
      210/403; 210/380.1; 494/36; 209/303; 209/304
[58] Field of Search ............... 210/373, 374, 375, 392,
      210/393, 394, 396, 403, 360.1, 380.1; 209/390,
      380, 303, 304; 494/36

[56] References Cited

U.S. PATENT DOCUMENTS

| 725,440 | 4/1903 | Hall et al. | 210/380.1 |
|---|---|---|---|
| 959,173 | 5/1910 | Shapley | 210/380.1 |
| 1,922,629 | 8/1933 | Neuman | 210/375 |
| 2,057,755 | 10/1936 | Wilderman | 210/374 |
| 2,548,417 | 4/1951 | Baxter | 210/373 |
| 2,685,968 | 8/1954 | Hertrich | 210/375 |
| 2,692,725 | 10/1954 | Hensgen | 210/375 |
| 3,242,872 | 3/1966 | Thompson | 103/220 |
| 3,333,700 | 8/1967 | Coleman | 210/158 |
| 3,642,139 | 2/1972 | Wilson | 210/374 |
| 3,679,035 | 7/1972 | Schmitt | 210/403 |
| 3,797,662 | 3/1974 | Titus | 210/403 |
| 4,287,064 | 9/1981 | Ando | 209/390 |
| 4,518,494 | 5/1985 | Jackson | 210/158 |
| 4,724,077 | 2/1988 | Uchiyama | 210/403 |
| 4,812,231 | 3/1989 | Wiesemann | 210/158 |
| 4,814,076 | 3/1989 | Jackson | 210/380.1 |
| 4,822,486 | 4/1989 | Wilkins | 210/170 |

FOREIGN PATENT DOCUMENTS

| 22561 | 6/1954 | Fed. Rep. of Germany | 210/373 |
|---|---|---|---|
| 2823092 | 12/1978 | Fed. Rep. of Germany | 210/403 |
| 3600492 | 7/1987 | Fed. Rep. of Germany | 210/403 |
| 543422 | 7/1975 | U.S.S.R. | 210/374 |
| 598649 | 3/1978 | U.S.S.R. | 210/373 |
| 1242479 | 7/1986 | U.S.S.R. | 210/403 |

Primary Examiner—Stanley S. Silverman
Assistant Examiner—Thomas M. Lithgow
Attorney, Agent, or Firm—Armstrong & Kubovcik

[57] ABSTRACT

A self-cleaning strainer comprises a vertically disposed housing which contains a rotatable strainer basket. The housing has an open top, closed by a closure plate, an inlet adjacent the top of the housing and an outlet adjacent a closed bottom of the housing, the closed bottom having a flush discharge opening. The components used to rotate the strainer basket are disposed outside the flow of any water containing particulates that enters the housing. Cleaning devices such as a scraper blade supported in the strainer basket, a rotatable brush supported in the strainer basket, and a water jet manifold disposed between the housing sidewall and the sidewall of the strainer basket are used to clean the rotatable strainer basket.

17 Claims, 4 Drawing Sheets

SELF-CLEANING STRAINER

FIELD OF THE INVENTION

The present invention relates to a strainer apparatus and more particularly to a self-cleaning strainer used to remove particulates from water that is to be used in industrial installations.

BACKGROUND OF THE INVENTION

In many industrial installations, a large supply of water is often needed for cooling, flushing, or other applications. Such a large supply of water is usually taken from a body of water, such as a river, stream, pond or other water source, which contains particulate material, such as leaves, twigs, stones and the like, that would be harmful to industrial equipment and which particulate material must be removed. In order to remove such particulates, an initial bar screen may be used to filter out the largest articles, while other particulates are fed to a straining apparatus which may be a rotary strainer containing a rotary basket screen or other device to remove particulates.

The assignee of the present invention has, for example, provided strainers which are adapted for service on a suction side of pumps to strain liquid of foreign matter, and one such device is of a motorized self-cleaning type that contains a strainer basket in a housing, which basket is motor driven. A support with spokes suspends the strainer basket in the housing, while a brush, shear knife and/or water jet device is used to clean the strainer basket sidewall. A revolving brush on the outside of the strainer basket keeps the strainer basket openings free from clogging, while a shear knife on the outside of the strainer basket shears any protruding matter from the basket as it revolves, and high pressure cleaning jets pressure clean the strainer basket as it revolves, forcing debris from the strainer basket and its openings. While this type of device is eminently suited for most applications, the support and spokes are positioned in the flow of water containing particulates and collection of debris thereon or wearing of the same by contact with the particulate-containing water would best be avoided.

It is an object of the present invention to provide a self-cleaning strainer where the apparatus used to rotate the strainer basket is positioned out of the flow of liquid containing particulates that is fed to the strainer basket.

It is another object of the present invention to provide cleaning devices for the wall of the strainer that better act to clean the openings and inner surface of the wall of the strainer basket.

SUMMARY OF THE INVENTION

A self-cleaning strainer has a vertically disposed housing with a sidewall, open top and bottom wall, the top sealed by a closure plate. An inlet is provided in the housing sidewall adjacent the top while an outlet is provided adjacent the bottom, preferably opposite the inlet, and a flush discharge opening is formed in the bottom wall. Disposed in the housing is a rotatable strainer basket that has an open top and bottom and a foraminous side wall, the basket spaced from the sidewall of the housing and below the inlet, such that liquid, with particulates, enters the housing and passes into the strainer basket, and particulates are collected on the inner surface of the basket sidewall while clean liquid passes through openings in the sidewall and is discharged from the housing through the outlet. A means for rotating the strainer basket is provided in the housing and is positioned out of the flow of the liquid containing particulates, preferably in spacing between the strainer basket and the housing sidewall.

Cleaning devices clean the inner surface of the sidewall of the strainer basket and may have a scraper blade, rotating brush or a water jet device, or any combination thereof. The scraper blade, when used, is supported in the strainer basket and an adjustment device is used to vary the pressure of contact of a blade on the inner surface of the strainer basket. The rotating brush, when used, is supported in the strainer basket in an eccentric manner, such that a bristled portion of the brush contacts the inner surface and the bristled portion may be moved relative to the sidewall to provide a predetermined degree of contact. The rotatable brush is rotatable in a direction opposite the rotation of the strainer basket. The water jet device, when used, is disposed in the spacing between the housing sidewall and the sidewall of the strainer basket and has nozzles that direct jets of water against the strainer basket sidewall to clean openings therein.

In a most preferred embodiment, a scraper blade is provided in the strainer basket and a rotatable brush is also supported in the strainer basket adjacent and beyond the scraper blade, in the direction of rotation of the strainer basket.

DESCRIPTION OF THE DRAWINGS

The invention will become more readily apparent from the following description of preferred embodiments thereof shown, by way of example only, in the accompanying drawings, wherein.

DETAILED DESCRIPTION

Figure 1:
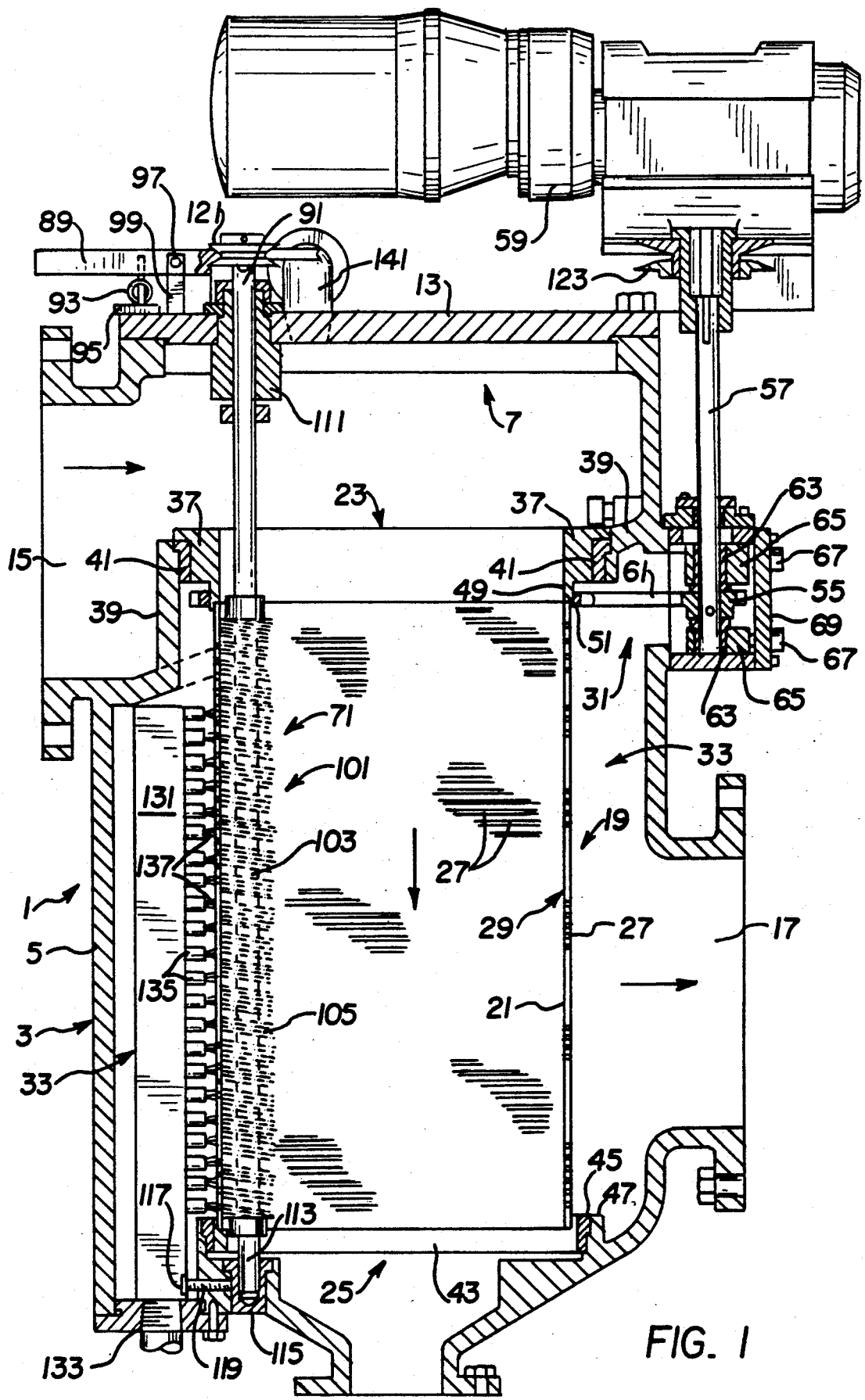
FIG. 1 is a vertical cross-section through a self-cleaning strainer of the present invention, taken generally along lines I—I of FIG. 4, showing the rotatable brush and water jet manifold cleaning device.

Referring now to FIG. 1, a self-cleaning strainer 1 of the present invention is illustrated, having a vertically disposed housing 3 which has an upstanding side wall 5, an open top 7 and a bottom wall 9. A flush discharge opening 11 is provided in the bottom wall 9 which is attachable to a discharge valve (not shown), such as a shear gate valve. A cover plate 13 sealingly closes the open top 7 of the housing 3. An inlet 15 is provided in the side wall 5 for charging to the housing of a liquid containing particulates, the inlet 15 positioned adjacent the open top 13 of the housing 3. An outlet 17 is also provided in the side wall 5 adjacent the bottom wall 9 for discharge from the housing 3 of clear liquid after particulates have been removed therefrom. Disposed in the housing 3 is a rotatable strainer basket 19 which has a cylindrical foraminous side wall 21, an open top 23 and an open bottom 25. The cylindrical foraminous side wall 21 has openings 27 therethrough such that liquid may pass through the side wall while particulates will be removed from the liquid and collected on the inner surface 29 of the foraminous side wall 21. The sidewall 21 of the strainer basket may be formed from a mesh-like material, a perforated sheet material, a series of spaced bars, as illustrated, or other material forming a foraminous side wall for the basket.

A means 31 is provided for rotating the strainer basket 19, which means 31 is positioned out of the flow of liquid containing particulates, such as in a spacing 33 between the upstanding sidewall 5 of the housing 3 and the cylindrical foraminous sidewall 21 of the strainer basket 19. As illustrated, the strainer basket 19 preferably has an upper portion 35 that has a shoulder 37 which extends outwardly therefrom, while an inwardly directed flange 39 is provided on the upstanding sidewall 5 of the housing 3, with the shoulder 37 and flange 39 rotatably sealingly engaged through an upper bearing 41. The strainer basket 19 also has a lower portion 43 which is rotatably sealingly engaged through a lower bearing 45 with an upwardly extending flange 47 on the bottom wall 9 of the housing 3. In order to ensure that no restriction to flow of the liquid through the self-cleaning strainer occurs, the area of the spacing 33 between the upstanding sidewall of the housing and the cylindrical foraminous sidewall 21 of the strainer basket 19 is greater than the cross-sectional area of the opening of the inlet 15.

The upper portion 35 of the strainer basket 21 has a lip 49 extending downwardly therefrom, which lip 49 has outwardly extending sprockets 51. A drive housing 53 is carried by the housing 3, which contains a sprocket wheel 55 connected to a motor shaft 57, the motor shaft in turn connected to a motor 59 for rotation of the shaft and sprocket wheel 55. A chain 61 engages with the sprocket wheel 55 and the sprockets 51 on the downwardly extending lip 49 of the upper portion 34 of the strainer basket 19.

The shaft 57 is mounted in spaced bearings 63 disposed in slideable blocks 65 and adjusting screws 67 may be threaded through an end wall 69 of the drive housing 53 so as to loosen or tighten the contact of the chain 61 with the sprockets 51.

In operation of the self-cleaning strainer 1, water containing particulates is charged to the housing 3 through inlet 15 and flows, as shown by the arrows in FIG. 1, downwardly through the open top 23 of the strainer basket 19. The water is then directed through the openings 27 in the sidewall 21 of the strainer basket and clean water is discharged from the housing 3 through outlet 17. Particulates removed from the water are collected on the inner surface 29 of the sidewall 21 of the strainer basket 19. The inner surface 29 of the sidewall 21 of the strainer basket 19 must be periodically cleaned and a means 71 for cleaning the inner surface 29 is provided.

Figure 2:
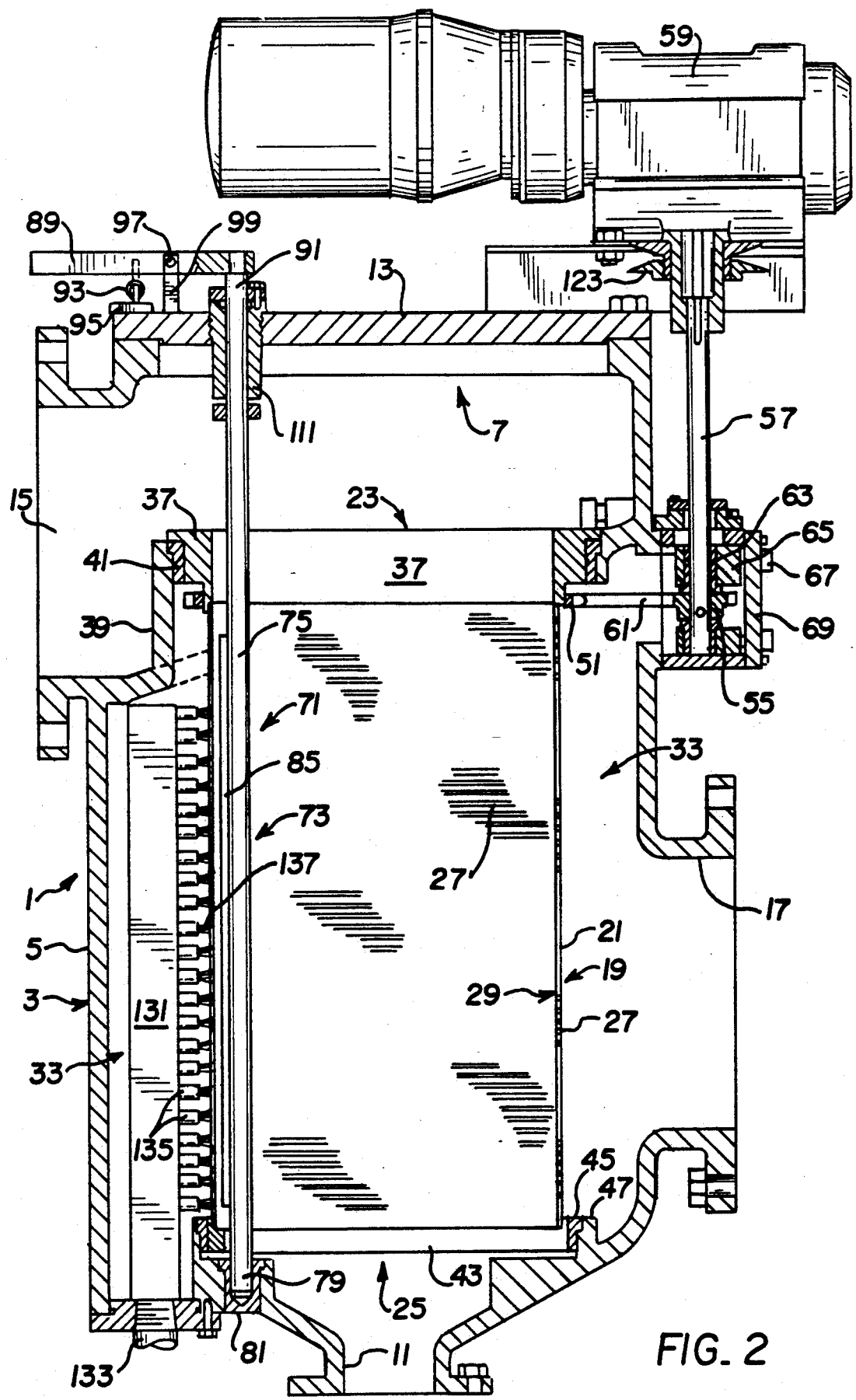
FIG. 2 is a vertical cross-section through a self-cleaning strainer of the present invention as shown in FIG. 1, with the rotatable brush removed to better show the scraper blade in position.
Figure 3:
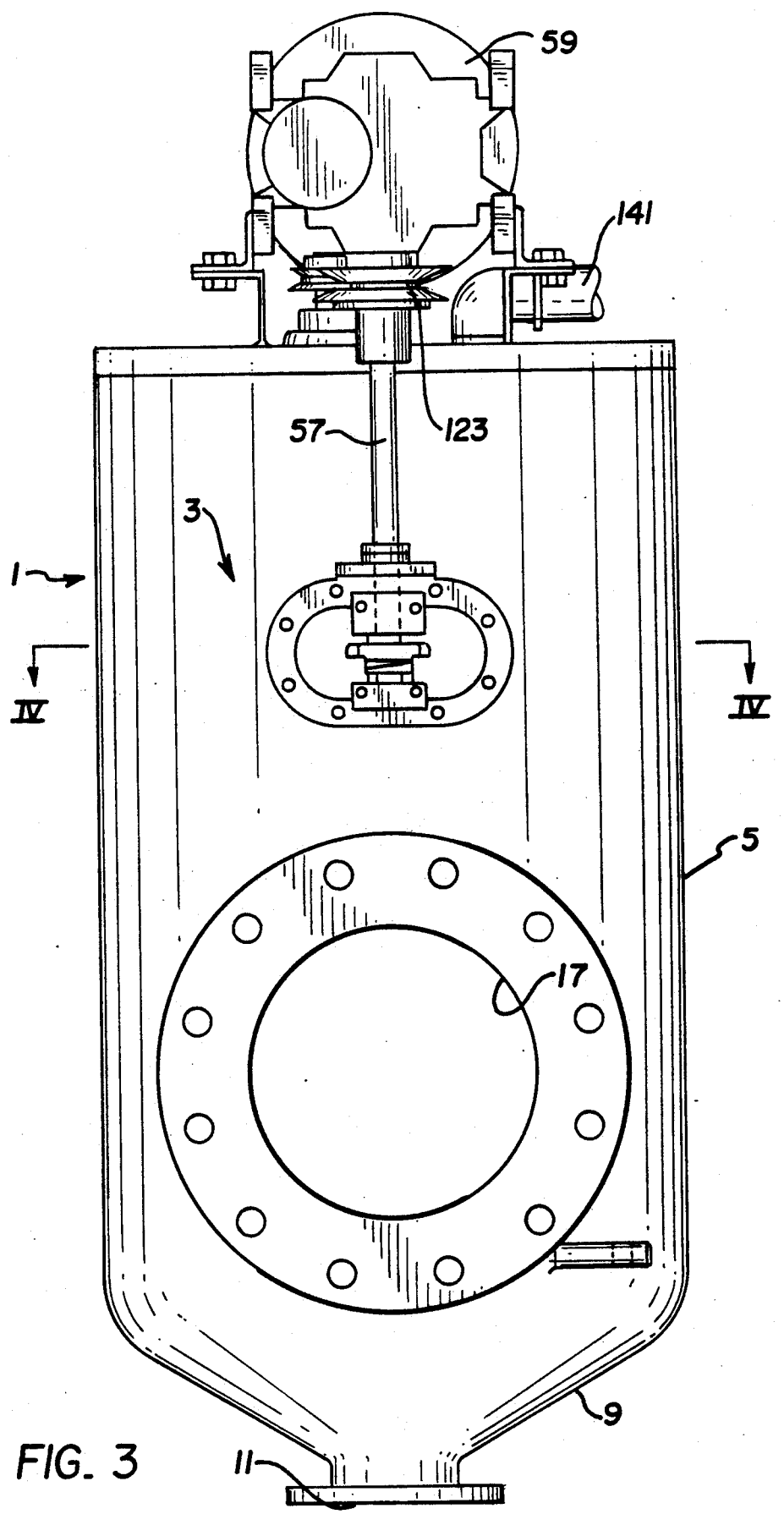
FIG. 3 is an elevational view of a self-cleaning strainer of the present invention looking towards the outlet in the sidewall of the housing.
Figure 4:
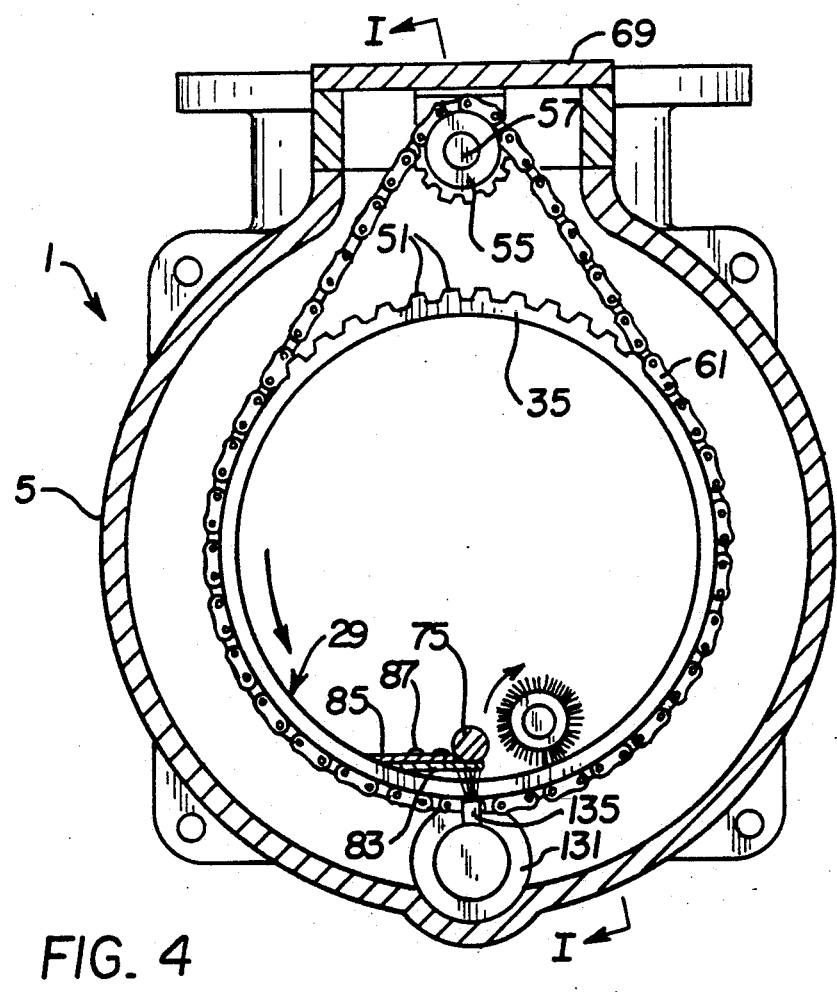
FIG. 4 is a cross-sectional view of the self-cleaning strainer of the present invention taken along lines IV—IV of FIG. 3.

The means 71 may comprise a scraper blade, a rotatable bush, or a plurality of jet nozzles, or any combination of these cleaning components. As best shown in FIGS. 2 and 4, where the means for cleaning the inner surface 29 is a scraper blade, a scraper blade 73 is supported in the strainer basket 19 and is positioned to contact the inner surface 29 of the sidewall 21. The scraper blade 73 has a support shaft 75 which extends downwardly through a bushing 77 in the closure plate 13, with the support shaft 75 lower end 79 disposed in a collar 81 in bottom wall 9 of the housing 3. A blade support 83 is secured to the support shaft 75 and a blade 85 is releasably secured to the blade support 83, such as by screws or bolts 87. The tension of the blade portion 85 against inner surface 29 of the side wall 21 is adjustable through use of an adjustment bar 89 attached to the upper end 91 of the support shaft 75, which adjustment bar 89 is held under tension by use of a spring 93 attached to the adjustment bar 89 and a spaced spring stop 95. An adjustment screw 97, carried in a post 99, on the cover plate 13, contacts the adjustment bar 89 and controls the pressure of contact of the blade 85 on the inner surface 29 of the sidewall 21 of strainer basket 19.

Figure 5:
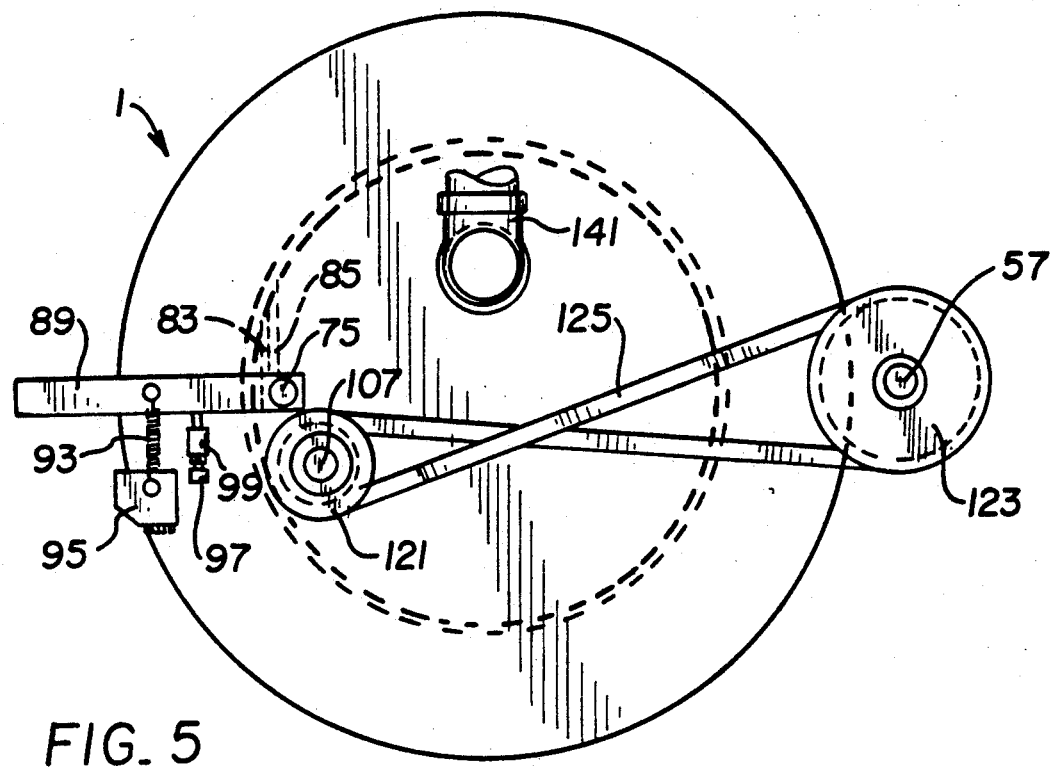
FIG. 5 is a top plan view of the self-cleaning strainer of the present invention with the motor removed to show the means for rotating a brush and adjusting a scraper blade.

In an embodiment where the means for cleaning the inner surface 29 is a rotatable brush, as best shown in FIGS. 1, 4 and 5, a rotatable brush 101 is supported in the strainer basket 19 and is positioned to contact the inner surface 29 of the sidewall 21. The rotatable brush 101 comprises a bristled portion 103, having bristles 105, carried by a brush shaft 107, the upper portion 109 of the brush shaft 107 passing through an eccentric bushing 111 in the cover plate 13, while the lower portion 113 thereof is supported in a lower brush shaft bearing 115 in the bottom wall 9 of the housing 3. The lower brush shaft bearing 115 is an eccentric bearing secured in position by a set screw 117 engaged in threaded aperture 119 through the bottom wall 9 of the housing 3. A first sheave 121 is secured to the upper portion 109 of the brush shaft 107, while a second sheave 123 is secured to the motor shaft 57. A belt 125 is engaged in a figure-eight manner with sheaves 123 and 121, such that rotation of the motor shaft 57 will rotate the strainer basket 19 in one direction while, at the same time, the brush shaft 107 will rotate the bristled portion 103 of the brush 101 in the opposite direction. The bristled portion 103 of the rotatable brush 101 may be of various configurations but, as illustrated in FIG. 1, the bristled portion 103 preferably has bristles 105 in a spiral downwardly directed pattern which will direct particulates downwardly towards the flush discharge opening 11 of the housing 3. The bristled portion 103 of the brush may be provided in a wide range of bristle tuft configurations, so as to meet particular conditions of media for which the strainer is being used.

In the embodiment of the self-cleaning strainer 1 of the present invention, where both a scraper blade 73 and a rotatable brush 101 are provided to clean the inner surface 29 of the sidewall 21 of the strainer basket 19, the brush 101 is located, as illustrated in FIG. 4, adjacent and beyond the scraper blade 75 in the direction of rotation of the strainer basket 19.

The bristled portion 103 of the rotatable brush 101 is first positioned such that the outer ends of the bristles 105 lightly touch the inner surface 29 and, when wearing of the bristles 105 occurs, the eccentric bearings enable the rotatable brush 101 to be moved relative to the inner surface 29 to provide for subsequent contact of the bristles 105 therewith.

In an embodiment where the means for cleaning the inner surface 29 is a plurality of jet nozzles, a water jet manifold 131 is positioned in the spacing 33 between the upstanding side wall 5 of the housing 3 and the sidewall 21 of the strainer basket 19, with an inlet 133 secured to the water jet manifold 131 and a source of pressurized water (not shown) which may pass through the bottom wall 9 of the housing 3. Nozzles 135 are provided on the water jet manifold 131, which nozzles face the cylindrical side wall 21 of the strainer basket 19, such that pressurized water fed to the water jet manifold 131 will be discharged through the nozzles 135 and directed as water sprays 137 through the openings 27 in the sidewall 21 of strainer basket 19.

A flush water conduit 141, attachable to a flush water pump (not shown) is provided which connects with an opening 143 in the cover plate 13 to charge flush water through the cover plate 13 and downwardly through the strainer basket 19.

Cleaning of the self-cleaning strainer is effected when desired, usually when a pressure drop is noted between the inlet 15 and outlet 17 of the housing 3, such as a pressure drop of about 5 pounds per square inch or more, indicating plugging of the openings 27 of the cylindrical foraminous sidewall 21 of the strainer basket 19. When cleaning is desired, an automatic control system may be used to start the motor 59 which, through shaft 57, turns the sprocket wheel 55 and chain 61 which rotates the strainer basket 19, while at the same time turns the belt 125 which rotates the rotatable brush 101 in the opposite direction of rotation of the strainer basket 19, such that the bristled portion 105 brushes the inner surface 29 of the sidewall 21 of the strainer basket 19. As the strainer basket 19 rotates, the blade 85 of scraper blade 73 scrapes along the inner surface 29 to shear any fibers or other particulates clogging the openings 27, while the rotatable brush 101 brushes the surface 29 immediately following such shearing. The water sprays 137, from nozzles 135, of the water jet manifold may also be used to flush particulates from the openings 27 in the sidewall 21 into the interior of the strainer basket 19.

The loosened particulates fall through the open bottom 25 of the strainer basket 19 and are discharged through the flush discharge opening 11. The flush discharge opening 11 may be open to an off-take continuously or a shear gate valve may be used to close the same when desired. If more flushing of the strainer basket and flush discharge opening 11 is desired, flush water may be charged through flush water conduit 141 downwardly through the strainer basket 19. When the strainer basket 19 has been cleaned, the motor 59 is shut down and the rotation of the strainer basket 19 and rotatable brush 101 terminated. The self cleaning strainer may then be used to clean further particulate-laden water.

A cleaning operation may also be effected without interruption of service of the strainer by simply opening a shear gate valve attached to the flush discharge opening 11.

Also, the strainer may be cleaned by temporarily taking the strainer out of service by closing a valve in a conduit leading to inlet 15, as well as a valve in a conduit leading from outlet 17 and then opening a shear gate valve attached to the flush discharge opening 11. Flush water is then charged through flush water conduit 141 downwardly through the strainer basket 19 which will flush out debris through the flush discharge opening 11.

The cleaning of the strainer can be effected, as above-described by use of a pressure drop activated device, by a time activated device to periodically flush out the strainer, or by a device responding to any other preferred electrical or other signal.

A control panel may be provided that cooperates with the strainer and can be programmed for any type of flushing and in response to any desired signal, so that the user has great flexibility with respect to flushing procedures and the reason for a flushing cycle. Also, the allowable time for flushing can be pre-established and programmed into a control panel. Such a programmer is not necessary to any of the above cleaning procedures, since a user may tie it into the user's own system or effect such a cleaning procedure manually or semi-automatically. Use of such a control panel, however, allows for programming and automatic cleaning to suit a particular installation.

What is claimed is:

1. A self-cleaning strainer comprising:
   a vertically disposed housing having an upstanding side wall, an open top and a bottom wall;
   said housing having an inlet in the side wall for a liquid containing particulates, adjacent said open top, an outlet in the side wall adjacent said bottom wall for clean liquid, and a flush discharge opening in said bottom wall;
   a cover plate sealingly closing the open top of said housing;
   a rotatable strainer basket, having a cylindrical foraminous side wall with an inner surface and an open top and bottom, with openings through said cylindrical side wall for flow of liquid therethrough, disposed in said housing, spaced from said side wall of said housing and disposed below said inlet, such that liquid containing particulates entering said inlet passes into said strainer basket and outwardly through said openings to remove said particulates, and clean liquid is directed through said outlet;
   means for rotating said strainer basket in said housing, said means for rotating being positioned out of the flow of liquid containing particulates, and disposed within said housing between said cylindrical side wall of said strainer basket and said upstanding side wall of said housing; and
   means for cleaning the inner surface of the cylindrical side wall of said strainer basket to remove particulates which are collected thereon.

2. The self-cleaning strainer as defined in claim 1, wherein said means for cleaning the inner surface of the cylindrical side wall of said strainer basket comprises a scraper blade, positioned to contact said inner surface, supported in said strainer basket in said housing.

3. The self-cleaning strainer as defined in claim 2, including means for varying the pressure of contact of said scraper blade on said inner surface.

4. The self-cleaning strainer as defined in claim 1, wherein said means for cleaning the inner surface of the cylindrical side wall of said strainer basket comprises a rotatable bristled brush, positioned such that the bristles on said brush contact said inner surface, supported in said strainer basket in said housing, said rotatable brush rotatable in a direction opposite the rotation of said strainer basket.

5. The self-cleaning strainer as defined in claim 4, wherein said rotatable bristled brush is mounted eccentrically in a bushing.

6. The self-cleaning strainer as defined in claim 1, wherein said means for cleaning the inner surface of the cylindrical side wall of said strainer basket comprises a water jet manifold, positioned in the spacing between said cylindrical side wall and said side wall of said housing, said water jet manifold having nozzles through which water is sprayed through said openings in the cylindrical side wall of said strainer basket.

7. The self-cleaning strainer as defined in claim 1, wherein said means for cleaning the inner surface of the cylindrical side wall of said strainer basket comprises a scraper blade, positioned to contact said inner surface, and a rotatable bristled brush, positioned such that the bristles on said brush contact said inner surface, said scraper blade and said bristled brush supported in said strainer basket in said housing, with said bristled brush located adjacent and beyond said scraper blade in the direction of rotation of said strainer basket.

8. The self-cleaning strainer as defined in claim 7, including a water jet manifold, positioned in the spacing between said cylindrical side wall and said side wall of said housing, said water jet manifold having nozzles through which water is sprayed through said openings in the cylindrical side wall of said strainer basket.

9. The self-cleaning strainer as defined in claim 1, wherein the area of said space between the side wall of said housing and the cylindrical side wall of said strainer basket is greater than the cross-sectional area of said inlet.

10. A self-cleaning strainer comprising:
vertically disposed housing having an upstanding side wall, an open top and a bottom wall;
said housing having an inlet in the side wall for a liquid containing particulates, adjacent said open top, an outlet in the side wall adjacent said bottom wall for clean liquid, a flush discharge opening in said bottom wall and an inwardly directing flange on said sidewall;
a cover plate sealingly closing the open top of said housing;
a rotatable strainer basket, having a cylindrical foraminous side wall with an inner surface and an open top and bottom, with openings through said cylindrical side wall for flow of liquid therethrough, disposed in said housing, spaced from said side wall of said housing and disposed below said inlet, said strainer basket having a top annular shoulder with a downwardly extending lip thereon having sprockets extending outwardly therefrom, which annular shoulder contacts said inwardly directed flange on the sidewall of said housing to form a closure therebetween, such that liquid containing particulates entering said inlet passes into said strainer basket and outwardly through said openings to remove said particulates, and clean liquid is directed through said outlet;
means for rotating said strainer basket in said housing, out of the flow of liquid containing particulates comprising a rotatable sprocket wheel, and a chain engaged with said sprocket wheel and said sprockets on said strainer basket; and
means for cleaning the inner surface of the cylindrical side wall of said strainer basket to remove particulates which are collected thereon.

11. The self-cleaning strainer as defined in claim 10, wherein said means for cleaning the inner surface of the cylindrical side wall of said strainer basket comprises a scraper blade, positioned to contact said inner surface, supported in said strainer basket in said housing.

12. The self-cleaning strainer as defined in claim 11, including means for varying the pressure of contact of said scraper blade on said inner surface.

13. The self-cleaning strainer as defined in claim 10, wherein said means for cleaning the inner surface of the cylindrical side wall of said strainer basket comprises a rotatable bristled brush, positioned such that the bristles on said brush contact said inner surface, supported in said strainer basket in said housing, said rotatable brush rotatable in a direction opposite the rotation of said strainer basket.

14. The self-cleaning strainer as defined in claim 13, wherein means for rotating said brush comprises a motor shaft carrying said sprocket wheel, a first sheave connected to a brush shaft carrying said bristled brush, a second sheave connected to said motor shaft, and a belt engaged between said first and second sheaves.

15. A self-cleaning strainer comprising:
a vertically disposed housing having an upstanding side wall, an open top and a bottom wall;
said housing having an inlet in the side wall for a liquid containing particulates, adjacent said open top, an outlet in the side wall adjacent said bottom wall for clean liquid, and a flush discharge opening in said bottom wall;
a cover plate sealingly closing the open top of said housing;
a rotatable strainer basket, having a cylindrical foraminous side wall with an inner surface and an open top and bottom, with openings through said cylindrical side wall for flow of liquid therethrough, disposed in said housing, spaced from said side wall of said housing and disposed below said inlet, such that liquid containing particulates entering said inlet passes into said strainer basket and outwardly through said openings to remove said particulates, and clean liquid is directed through said outlet;
a top annular shoulder on said cylindrical side wall of said strainer basket, and an inwardly directed flange on the side wall of said housing which contacts said shoulder to form a closure therebetween, said top annular shoulder having a downwardly extending lip having sprockets thereon extending outwardly therefrom;
means for rotating said strainer basket in said housing, said means for rotating being positioned out of the flow of liquid containing particulates; and engaging said sprockets on said downwardly extending up; and
means for cleaning the inner surface of the cylindrical side wall of said strainer basket to remove particulates which are collected thereon.

16. The self-cleaning strainer as defined in claim 15, wherein said means for rotating said strainer basket comprises a sprocket wheel and a chain engaged with said sprocket wheel and the sprockets of the annular shoulder of said strainer basket.

17. The self-cleaning strainer as defined in claim 16, including means for adjusting the position of said sprocket wheel to tighten or loosen the engagement of said chain with the sprockets on the downwardly extending lip of the annular shoulder of said strainer basket.

* * * * *